United States Patent [19]

Hill

[11] Patent Number: 5,667,121
[45] Date of Patent: Sep. 16, 1997

[54] ENVIRONMENTALLY INSENSITIVE PAPER GUIDE FOR STRIP CHART RECORDERS

[75] Inventor: Douglas J. Hill, Renton, Wash.

[73] Assignee: Physio-Control Corporation, Redmond, Wash.

[21] Appl. No.: 626,644

[22] Filed: Apr. 1, 1996

Related U.S. Application Data

[63] Continuation of Ser. No. 219,389, Mar. 29, 1994, abandoned.

[51] Int. Cl.⁶ ........................................ B26F 3/02
[52] U.S. Cl. ........................ 225/43; 206/320; 225/54
[58] Field of Search ........................ 225/39, 40, 43, 225/50, 54; 83/162, 163, 161; 400/621, 693; 271/185; 206/305, 320

[56] References Cited

U.S. PATENT DOCUMENTS

| | | | |
|---|---|---|---|
| 877,454 | 1/1908 | Randall | 225/40 |
| 1,631,776 | 6/1927 | Sunday | 225/40 |
| 2,111,375 | 3/1938 | Steiner | 83/162 |
| 2,390,399 | 12/1945 | Tator et al. | 225/43 |
| 2,456,660 | 12/1948 | Werner | 225/40 |
| 2,510,306 | 6/1950 | Bachelder | 225/40 |
| 3,091,379 | 5/1963 | Bishop et al. | 225/40 |
| 3,092,380 | 6/1963 | Anderson et al. | 271/185 |
| 3,368,522 | 2/1968 | Cordis | 225/40 |
| 3,633,449 | 1/1972 | Knudsen | 83/163 |
| 4,042,939 | 8/1977 | Lloyd et al. | 346/153 |
| 4,335,950 | 6/1982 | Gunzelmann et al. | 355/3 R |
| 4,607,969 | 8/1986 | Collina | 400/693 |
| 4,641,980 | 2/1987 | Matsumoto et al. | 400/693 |
| 5,190,199 | 3/1993 | Bulger et al. | 225/50 |
| 5,366,306 | 11/1994 | Mizutani | 400/693 |

FOREIGN PATENT DOCUMENTS

2754108B1  5/1977  Germany .................. G01R 13/08

*Primary Examiner*—Kenneth E. Peterson
*Attorney, Agent, or Firm*—Christensen O'Connor Johnson & Kindness PLLC

[57] ABSTRACT

An environmentally insensitive device is described. The device uses a passive paper guide to direct an output paper stream from a paper source contained within the unit to an output aperture. The passive paper guide uses two opposing surfaces to define a radius of curvature through which the paper strip is guided. Use of longitudinal ridges along one or both of the surfaces reduces friction along the guide. By providing a rotatable output cover over the aperture and using a unit cover, a printed output can be achieved while maintaining the shielding of the unit from environmental effects.

13 Claims, 6 Drawing Sheets

ENVIRONMENTALLY INSENSITIVE PAPER GUIDE FOR STRIP CHART RECORDERS

This application is a continuation application based on prior application Ser. No. 08/219,389, filed on Mar. 29, 1994, now abandoned.

TECHNICAL FIELD

This invention relates to the field of strip chart recorders, and in particular, to a passive paper guide for guiding a strip of paper from a strip chart recorder through a radius of curvature so that the paper can be environmentally protected by an overlying cover.

BACKGROUND OF THE INVENTION

Several characteristics are important in mobile electronic devices. Among these are durability, simplicity, resistance to environmental conditions, low cost and low weight. Commonly, such electronic devices incorporate display devices, such as printers, for providing a visual image of data present in the devices. One area where this is useful is in devices used for electronic monitoring of patients in medical situations.

A strip chart recorder is often employed to provide a printed record, particularly for medical electronic devices. As data is output, a continuous stream of paper output is produced. This can occur, for example, when continuously monitoring a patient's physiological responses.

In mobile devices intended for use with exposure to all kinds of environmental conditions, inclusion of a paper output can provide easy access for moisture and other contaminants which can impair device performance. In particular, if the paper strip becomes moist at, or near, the printing location, the printing process can be significantly impaired. Moreover, when the paper becomes moist, drag between the paper strip and any surfaces with which it comes in contact may be increased significantly. This can disrupt the flow of paper and cause bunching or jamming of the output paper stream.

One possible technique for reducing this problem is to output the paper strip from the bottom of the mobile device. This can lower the likelihood that moisture in the form of rain or condensation will enter the device from above. However, this technique is impractical where the mobile device may be used on surfaces with debris or water build-up. Further, an output paper stream from the bottom of the device is often less accessible to the operator than a paper stream from the top or side of the device.

Regardless of which location is chosen for the output, the paper strip must be delivered from its supply location to an accessible output location where the data on the paper can be viewed and a length of paper can be removed from the device. Preferably, paper can be supplied from within the device from a source located near to the output to minimize the problems of transporting the paper. Because size, weight and other design constraints of mobile devices may limit the feasibility of locating the paper source near the output, this may not always be achievable. As a result, the paper strip often must be directed through some distance before exiting the device. Even where proximate location is feasible, some redirection of the paper strip may be desirable to allow the paper strip to be output at a desired location and angle.

Due to the lack of substantial rigidity in typical paper strips, transportation of the paper strip from the paper source to an output location presents problems. An extended length of paper is not easily pushed across any substantial distance, either upwardly or laterally, without significant bending. This presents a difficulty analogous to trying to push on a string. Rather than traveling toward the output, the paper doubles over itself. Increasing the pressure on the paper strip provides no benefit.

The paper strip's lack of substantial rigidity becomes even more problematic when the paper is to be directed through a defined angle of curvature from an upward direction toward the output location. As the paper is bent through the angle, the upward force on the paper strip is not transmitted well through the curve and does not translate into a lateral longitudinal force. Consequently, increasing upward longitudinal force serves only to increase the bending problem in the paper causing deviation from the desired angle of curvature.

One approach to these problems of delivering the paper strip from within the device to an output location, either laterally or vertically located with respect to the paper source is a mechanical aid such as mechanical rollers, either free or actively driven by the device. In mobile devices, this may result in added complexity and weight. It may also increase the difficulty of replacing a paper source in the field.

Alternately, the paper source may be designed such that the paper exits the paper source in substantially the same direction as the paper output. A lower support can be used supplementally to limit paper sagging. Where paper drag along the lower support is significant, this approach may still result in paper bunching. Moreover, because the paper stream usually must pass a printing element, such as a thermal printhead, the paper source orientation may be dictated by considerations relating to the printing source. For example, it may be desirable to pass the paper stream past the printhead vertically to minimize debris build-up between the printhead and the paper stream or to reduce effects of vertical forces, such as gravity or vibration.

In such cases, it is often desirable to use a mechanical guiding system which redirects the paper stream from the output of the printing source through a radius of curvature toward the desired output location. Addition of a mechanical guide often adds weight and complexity to the device. Further, as the paper stream is directed through a radius of curvature, it rubs along one surface of the guide. Friction between the paper stream and a surface of the guide may cause bunching of the paper stream, resulting in a paper jam within the guiding mechanism.

SUMMARY OF THE INVENTION

The present invention addresses the problems of added weight, complexity, environmental sensitivity, and reliability by providing a passive paper guide integrated within the device unit and/or a device cover.

The inventors have discovered that directing the paper strip toward an initially parallel curved surface allows the paper strip to be passively guided through a defined radius of curvature. An appropriately chosen radius of curvature defined by substantially parallel upper and lower walls permits the paper strip to be guided through an angle and across a substantial distance. The paper strip can thus be directed and transported from a paper source within the device body to an output aperture.

The integrated passive paper guide directs an output paper strip through a radius of curvature toward a desired output aperture using guide walls containing ridges for friction minimization. The reduced surface area of contact between the guide surface and the paper stream reduces the problems associated with paper wetness and contaminant buildup.

The problem of paper wetness is further reduced by directing the paper strip through an output aperture placed on the side of the device. The output aperture on the side of the device is shielded from environmental effects by an output aperture cover. The output aperture cover can also function as a latch to secure the device cover to the device.

In one embodiment, the inventive device further reduces complexity and weight by integrating the upper surface of the passive paper guide into the device cover and the lower surface of the passive paper guide into the topography of the upper surface of the device. A gap is formed between the upper surface of the paper guide and the lower surface of the paper guide when the environmentally protective device cover is in place. The paper strip is guided by the passive paper guide through the gap toward the output aperture, beneath the output aperture cover. The output aperture cover in one embodiment functions also as a cover latch.

The edges of the device cover in one embodiment form a seal when mated with the device unit, thereby leaving a gap only in the location of the paper output aperture to environmentally protect the device. The paper output aperture cover overhangs the edge of the output aperture, providing some shielding from environmental effects.

The paper output aperture cover in the preferred embodiment is shaped such that a paper-tearing ridge is formed along its distal end, permitting it to function also as a paper-tearing aid.

DETAILED DESCRIPTION OF THE INVENTION

Figure 1:
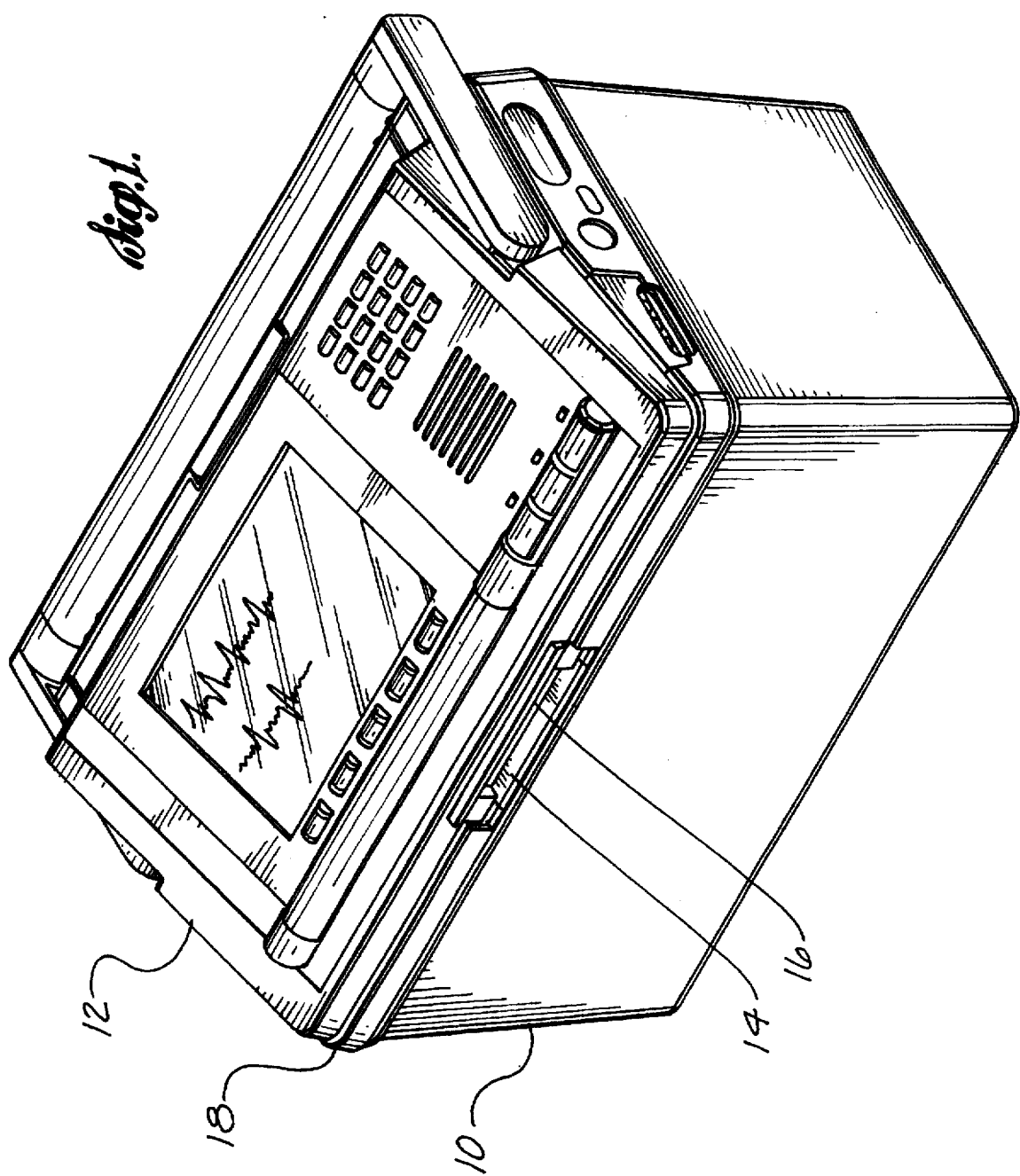
FIG. 1 is an isometric view of a portable defibrillator incorporating the inventive paper guide.
Figure 2:
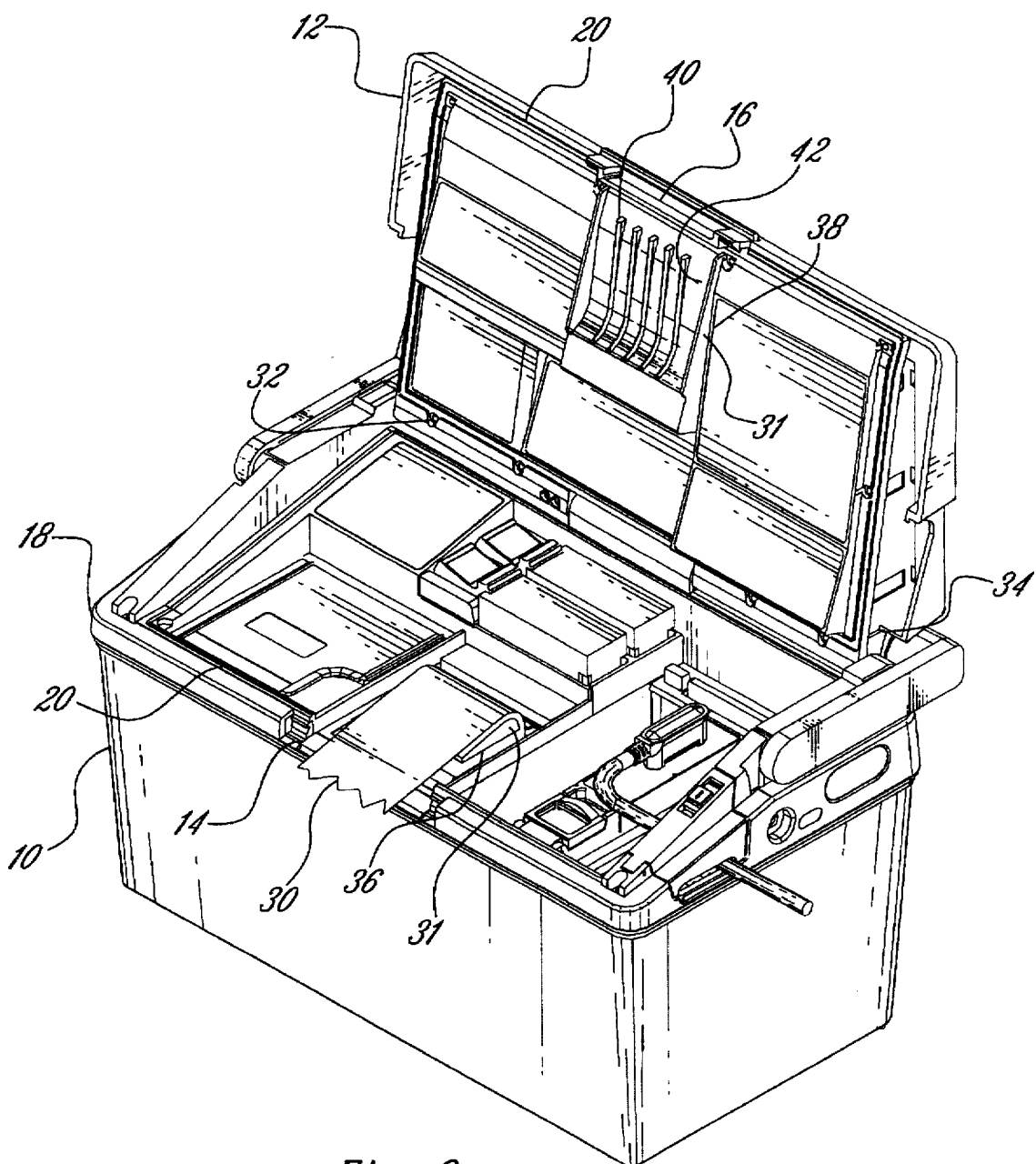
FIG. 2 is an isometric view of the portable defibrillator of FIG. 1 shown with a protective cover in its open position.

FIGS. 1 and 2 show a portable defibrillator incorporating the preferred embodiment of the present invention. The mobile electronic unit contains a body 10 and a cover 12. Incorporated in the cover 12 is an aperture 14 above which is located on aperture cover 16.

The cover 12 mates with an upper part 18 of the body 10 along an interface 20 (FIG. 2). In one embodiment of the device, the interface 20 forms an environmentally insensitive seal limiting passage of environment impact between the cover 12 and the upper part 18.

As can be seen from FIG. 2, the output aperture cover 16 provides a passage through which a paper strip 30 may pass. The cover 12 of the preferred embodiment is rotatably mounted to the upper part 18 by hinges 32, 34. Other configurations and mounting techniques will be obvious to those skilled in the art.

The paper strip 30 is guided by a paper guide 31 including an upper guide 38 having a guide surface 42 integrated into the cover 12 and a lower guide 36 incorporated in the upper part 18. Friction between the paper strip 30 and the guides 36 and 38 is reduced by inclusion of ridges 40 on the guide surface 42 of the upper guide 38 and on the lower guide 36. The ridges 40 are preferably longitudinal to direction of movement of the paper strip 30. FIG. 2 shows the upper guide 38 containing five longitudinal ridges 40; however, an alternate number of ridges may be chosen depending on the paper width, paper characteristics, and other design considerations. Moreover, a paper guide with no ridges is within the scope of the present invention.

Figure 3:
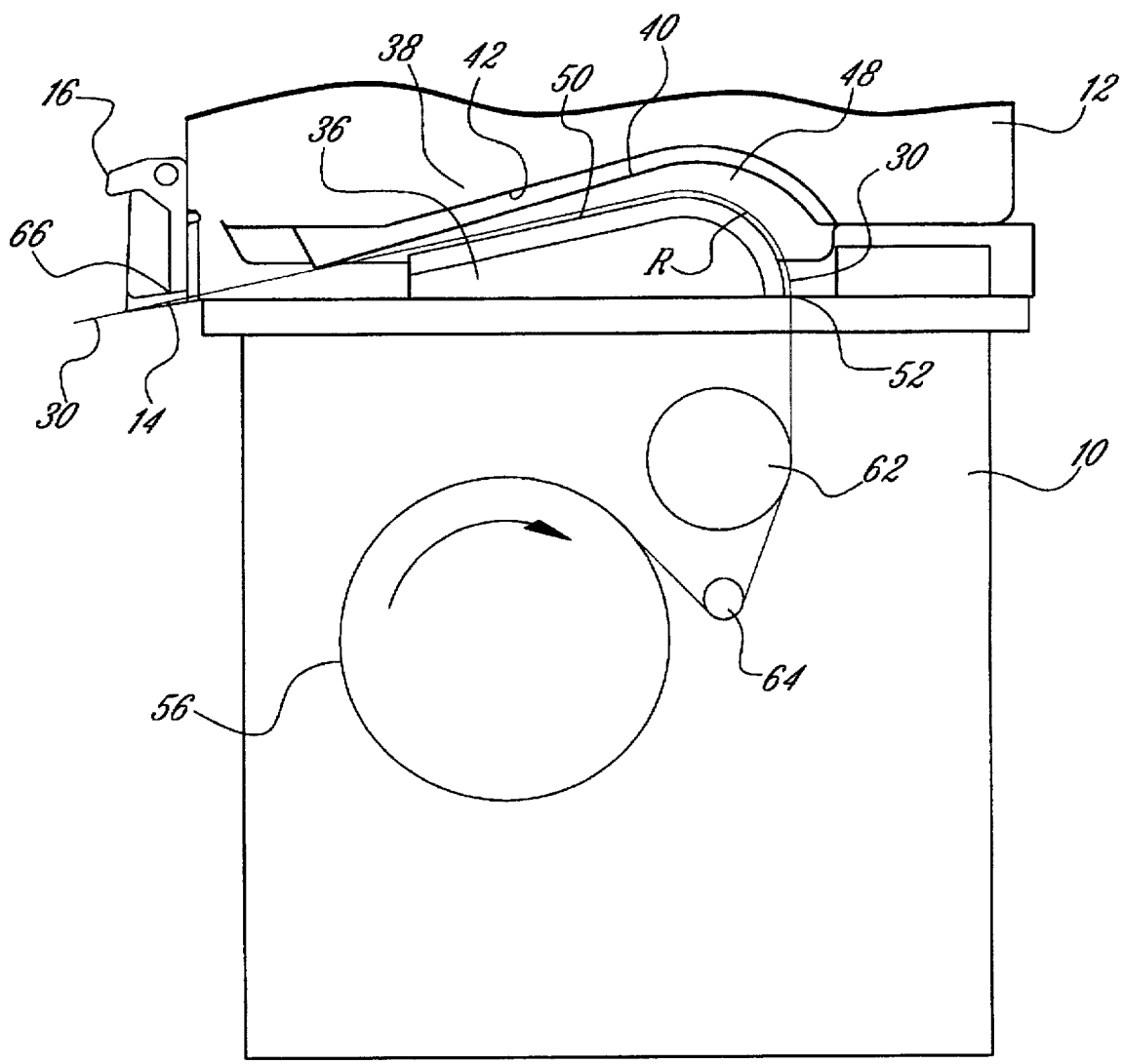
FIG. 3 is a side cross-sectional view of a portion of the defibrillator of FIG. 1 incorporating the inventive paper guide.

FIG. 3 shows a cross-sectional view of the device of FIG. 1 with the cover 12 in a closed position. When the cover 12 is in this closed position, a gap 48 remains between the longitudinal ridges 40 on the guide surface 42 of the upper guide 38 and a guide surface 50 of the lower guide 36. The gap 48 extends from the output aperture 14 to a lower body exit 52. Within the device body 10 is a paper spool 56 operating as a paper source.

As further shown in FIG. 3, the paper strip 30 exits from the paper spool 56 through paper drive spools 62, 64. The paper drive spools 62, 64 are presented in simplified fashion in FIG. 3 as circular cross-sections. Such drive mechanisms typically require an opposing spool or an opposing surface (not shown). Such paper drive mechanisms are known in the art.

The paper strip 30 exits the device body 10 through the lower body exit 52 and is guided through a radius of curvature R by the guide surface 50 of the lower guide 36 and the longitudinal ridges 40 incorporated in the upper guide 38. The paper strip 30 continues through the gap 48 toward the output aperture 14 passing below the output aperture cover 16. The output aperture cover 16 contains an edge 66 which can operate as a paper-tearing aid.

Figure 4A:
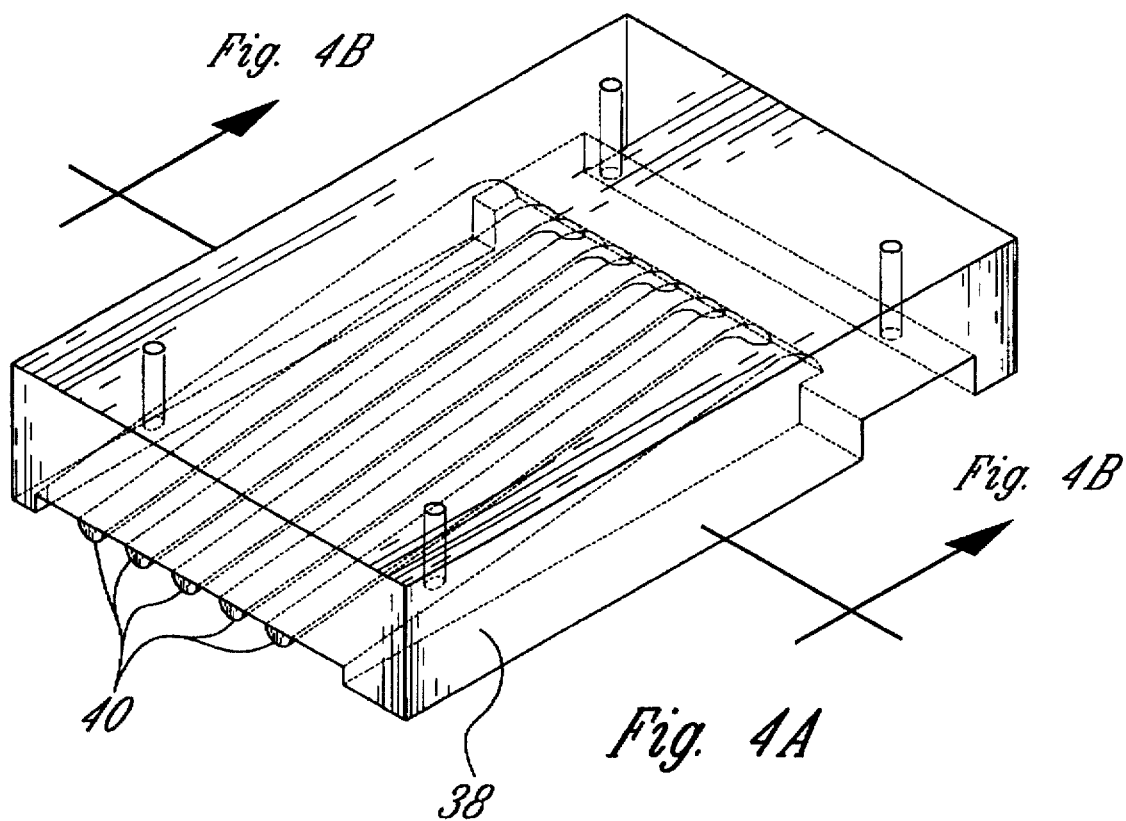
FIGS. 4A-B are detailed isometric and cross-sectional views, respectively, of the upper portion of the paper guide.
Figure 4B:
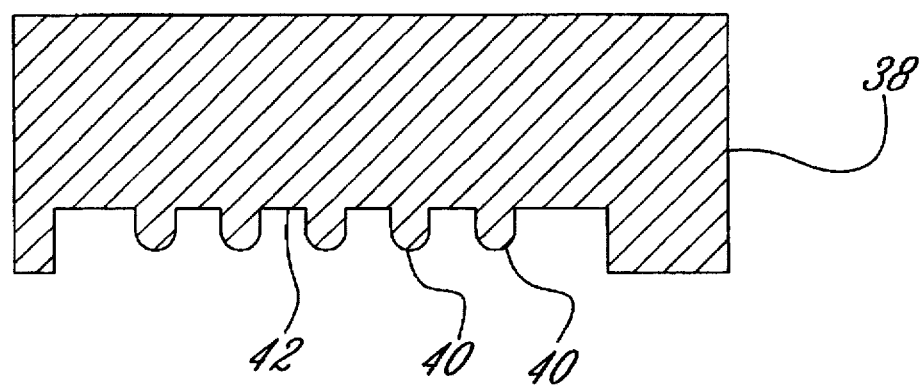

FIGS. 4A and B show the upper guide 38 in greater detail. As shown in FIG. 4B, the ridges 40 are incorporated directly into the upper guide 38. The longitudinal ridges 40 comprise protrusions with rounded edges to provide a surface having a relatively small area of contact with the paper strip 30 (not shown in FIG. 4B). Alternately, other topographies may be chosen to conform to specific manufacturing and design considerations in any given case. Further, the longitudinal ridges 40 may be discrete structures mounted on the device cover 12 rather than being integrated into the upper guide 38 itself.

Figure 5A:
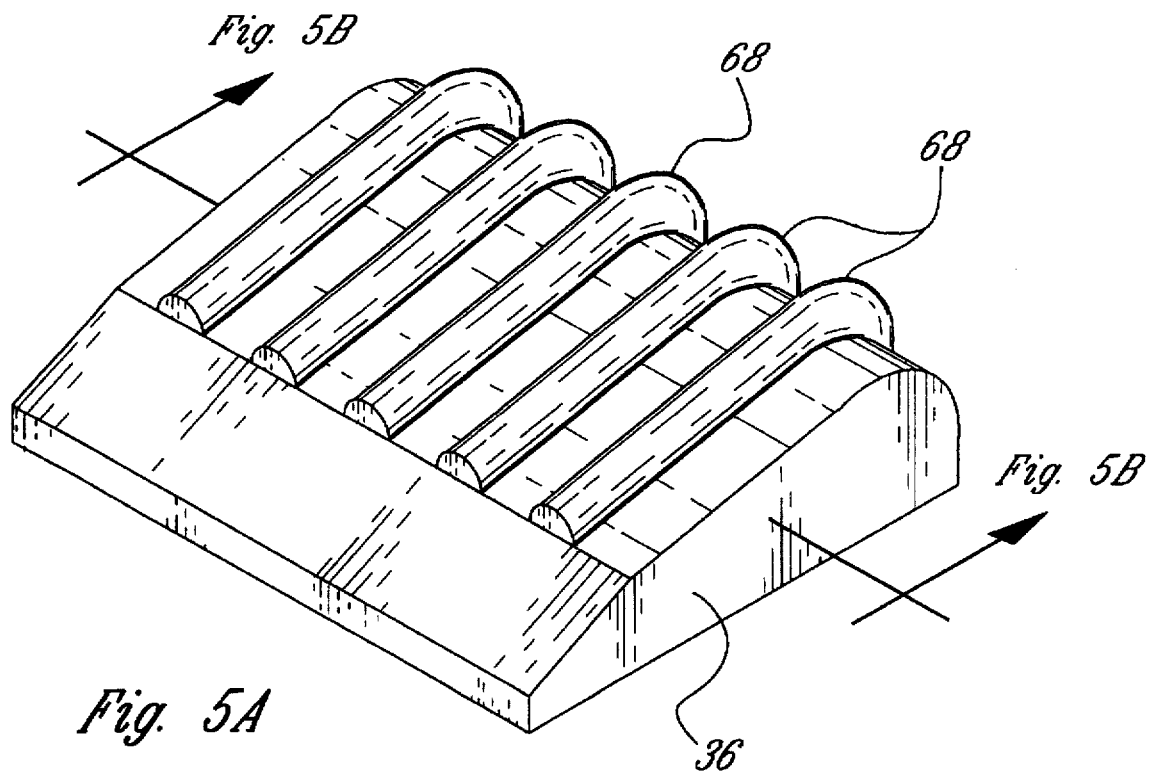
FIGS. 5A-B are detailed isometric and cross-sectional views, respectively, of the lower portion of the paper guide.
Figure 5B:
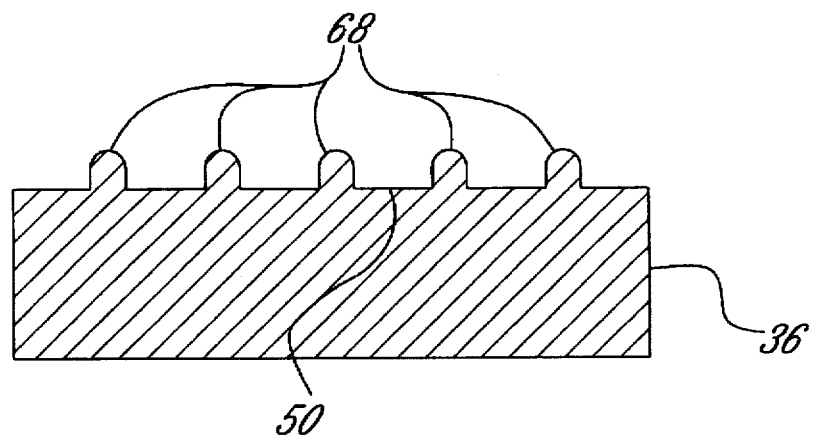

As shown in FIGS. 5A and B, the lower guide 36 may also incorporate a set of longitudinal ridges 68. It is preferred that the lower set of longitudinal ridges 68 be in alignment with respect to the upper ridges 40, although other orientations may be chosen. As shown in FIG. 5B, the set of longitudinal ridges 68 on the lower guide portion 36 have a similar topography to the longitudinal ridges 40 on the upper guide portion 38, except that the lower set of longitudinal ridges 68 extend upwardly from the guide surface 50 of the lower guide 36 rather than downwardly from the guide surface 42 of the upper guide 38.

In the preferred embodiment of FIGS. 4 and 5, five ridges 40, 68 are used having heights and widths of approximately 0.1 inch, and an edge radius of curvature of 0.375 inch. However, different ridge heights, ridge widths, numbers of ridges and ridge edge radii are within the scope of the invention.

Figure 6:
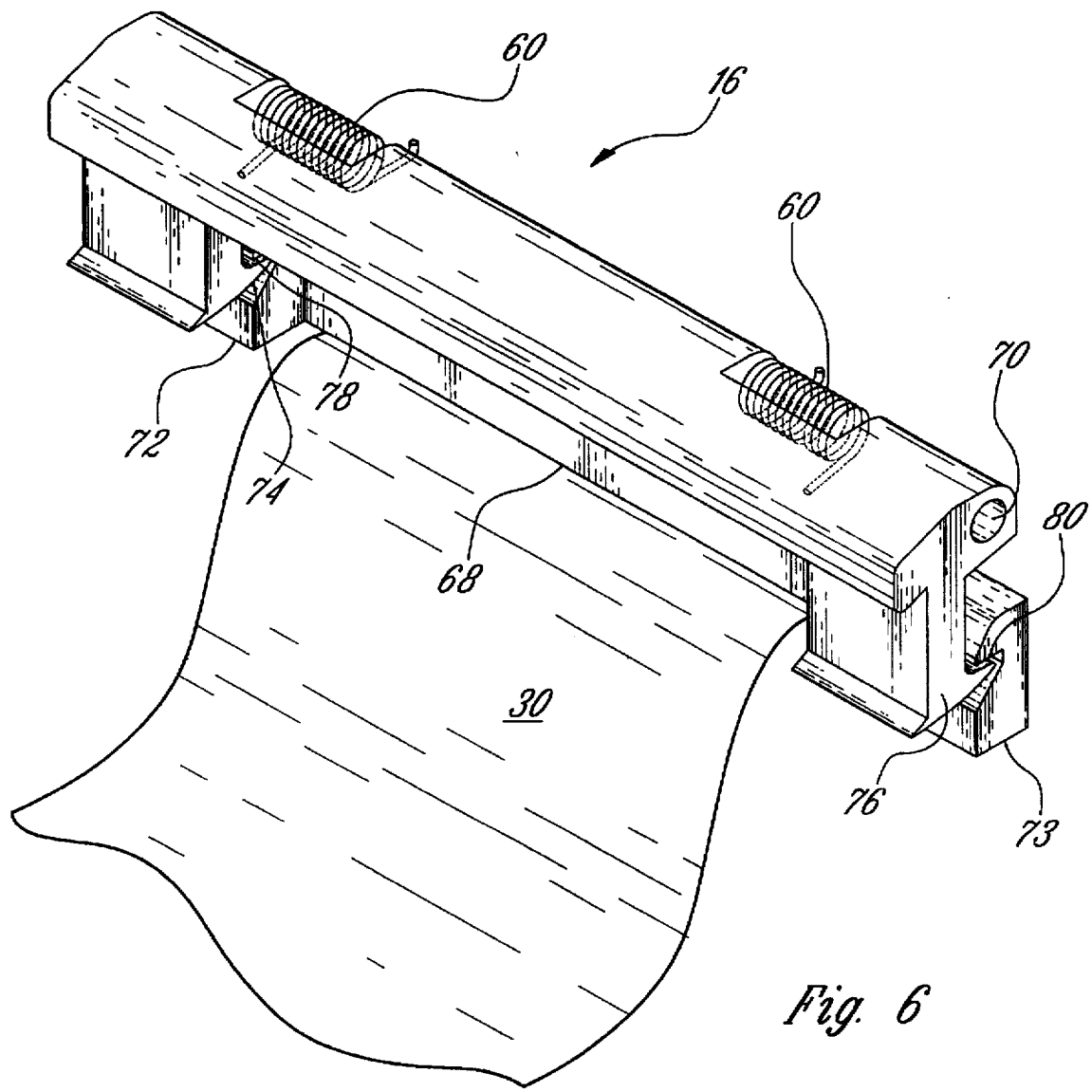
FIG. 6 is an isometric detail view of the latch cover.

FIG. 6 shows in detail a preferred embodiment of the aperture cover 16 mounted rotatably to the cover 12 around an axis 70 releasably to engage a catch block 72. In this embodiment, the protrusion 68 comprises a relatively sharp edge to aid in tearing the paper strip 30. Lower extensions 74, 76 of the aperture cover 16 engage the catch block 72 at edges 78, 80, allowing the output aperture cover 16 to function as a latch. Catch blocks 72, 73 are mechanically attached to the device body 10 (not shown).

When the cover 12 is in the closed position, bias springs 60 bias the lower protrusions 74, 76 against the extensions 78, 80 of the catch blocks 72, 73 such that the aperture cover 16 remains engaged with the catch blocks 72, 73. The aperture cover 16 may be disengaged from the catch blocks 72, 73 by applying upward pressure to overcome the bias of the bias spring 60 and rotate the aperture cover 16 around the axis 70 in a clockwise direction.

Operation of the preferred embodiment of the inventive device will now be explained with reference to FIG. 3. When the device is in operation, the paper strip 30 exits the paper spool 56 and is driven by the paper drive spool 62 toward the lower body exit 52. Located within the device body 10 is a printing element (not shown) at which the paper strip 30 is directed by the paper drive spool 62. Information is recorded on the paper strip 30 as it passes the printing elements (not shown) in a manner well known in the art.

The paper strip 30 then travels to the lower body exit 52. After passing through the lower body exit 52, the paper strip 30 enters the gap 48 and is directed through a radius of curvature R, typically through an angle of approximately 90°. Within the gap 48, friction between the paper strip 30 and the paper guides 36, 38 is minimized through the use of rounded ridges 40 and 68, which reduce the surface area of contact between the paper strip 30 and the guides 36, 38. The paper strip 30 exits the guides 36, 38 at the aperture 14 passing under the output aperture cover 16. In this manner, a continuous paper strip 30 can be produced.

In some cases, it may be desirable to tear off a portion of the paper strip 30. This can be done by cutting or tearing the paper strip 30 using the sharpened edge 66 in the aperture cover 16. A user can tear the paper strip 30 by applying sufficient upward force on the paper strip 30 against the sharpened edge 66. Though the sharpened edge 66 is shown in FIG. 3 as being placed above the output aperture 14, the sharpened edge 66 may be located elsewhere on the cover 12, or on the body 10.

Although preferred embodiments of the present invention have been described, it will be understood that the invention is not limited to the embodiments disclosed, but is capable of numerous arrangements, modifications, and substitutions of parts and elements without departing from the spirit of the invention. Accordingly, the invention is not limited except as by the appended claims.

I claim:

1. In a portable electronic device having a body and a cover, a paper guide for guiding a continuous strip of strip-chart paper from an outlet of a printer in which the printer expels paper in a first direction, the guide directing the continuous strip of strip-chart paper to an output aperture that is spaced apart from the printer outlet in a second direction that is substantially different from the first direction, the paper guide comprising:

an elongated upper guide that is longer in a direction that the paper is being guided than it is wide and having a downwardly facing guide surface that is adapted to reduce friction between the continuous strip of strip-chart paper and the guide surface, the upper guide being integrated into the cover of the portable electronic device; and an elongated lower guide that is longer in a direction that the paper is being guided than it is wide and having an upwardly facing guide surface that is adapted to reduce friction between the continuous strip of strip-chart paper and the guide surface, the lower guide being integrated into the body of the portable electronic device, the downwardly facing guide surface generally conforming to, but being spaced apart from, the upwardly facing guide surface to form a passage therebetween when the cover is affixed to the body of the portable electronic device, the passage having an outlet end positioned adjacent the output aperture and an inlet end positioned adjacent the printer outlet, the guide surfaces curving through an angle substantially conforming to the angle between the first and second directions so that the inlet end of the passage faces the printer outlet and an outlet end of the passage faces the output aperture, the strip-chart paper being conveyed from the printer outlet to the output aperture solely by the force of the printer pushing the continuous strip of strip-chart paper from the printer outlet.

2. The paper guide of claim 1 wherein the angle between the first and second directions is substantially 90 degrees whereby the passage curves at substantially a right angle.

3. The apparatus of claim 1 wherein the angle between the first and second directions is substantially equal to ninety degrees whereby the passage curves at substantially a right angle.

4. The apparatus of claim 1 wherein the guide surfaces each include a plurality of ridges projecting therefrom toward each other, the ridges oriented to extend along the direction from the inlet end to the outlet end.

5. The apparatus of claim 1, the cover comprising a latch mechanism rotatably mounted along one edge of the cover above the output aperture, the latch mechanism maintaining the cover in a closed position when the latch mechanism is rotated to a closed position.

6. A portable electronic device comprising:

a device body and a cover incorporating a paper guide for guiding a strip of strip-chart paper from an outlet of a printer in which the printer expels paper in a first direction, the guide directing the strip of strip-chart paper to an output aperture that is spaced apart from the printer outlet in a second direction that is substantially different from the first direction, the paper guide comprising an elongated upper guide that is longer than it is wide having a downwardly facing guide surface, and an elongated lower guide that is longer than it is wide having an upwardly facing guide surface, the downwardly facing guide surface generally conforming to, but being spaced apart from, the upwardly facing guide surface to form a passage therebetween, the passage having an outlet end positioned adjacent the output aperture and an inlet end positioned adjacent the printer outlet, the guide surfaces curving through an angle substantially conforming to the angle between the first and second directions so that the inlet end of the passage faces the printer outlet and an outlet end of the passage faces the output aperture, the strip-chart paper being conveyed from the printer outlet to the output aperture solely by the force of the printer pushing the strip-chart paper from the printer outlet; and a latch mechanism rotatably mounted along one edge of the cover above the output aperture, the latch mechanism maintaining the cover in a closed position when the latch mechanism is rotated to a closed position, the latch mechanism including a cutting edge positioned above the output aperture for cutting the paper strip after it has been expelled from the output aperture.

7. An environmentally insensitive electronic unit, comprising:

a device body;

an openable cover mounted on top of the device body;

a strip-chart paper source contained within the device body, the strip-chart paper source discharging the strip-chart paper at an initial angle facing upwardly toward the cover;

an elongated passive paper guide that is longer than it is wide having a paper input aperture located at a first distance from the paper source and a paper output aperture located near an edge of the cover above the device body, the paper input aperture facing downwardly to receive the strip-chart paper from the strip-chart paper source, the passive paper guide directing the strip-chart paper through a radius of curvature toward the paper output aperture; and an output aperture cover, the output aperture cover comprising a cover latch mounted mechanically to the openable cover at the paper output aperture, the cover latch holding the openable cover in a closed position when the cover latch is engaged.

8. The device of claim 7 wherein the cover latch further includes a cutting edge positioned adjacent the paper output aperture.

9. The device of claim 7 wherein the cover latch is rotatably mounted above the output aperture such that the paper strip passes beneath the cover latch when the paper strip exits the output aperture.

10. An environmentally insensitive electronic unit, comprising:

a device body;

an openable cover mounted on top of the device body;

a strip-chart paper source contained within the device body, the strip-chart paper source discharging a continuous strip of strip-chart paper at an initial angle facing upwardly toward the cover; and an elongated passive paper guide that is longer in a direction that the paper is being guided than it is wide having a paper input aperture located at a first distance from the paper source and a paper output aperture located near an edge of the cover above the device body, the paper input aperture facing downwardly to receive the continuous strip of strip-chart paper from the strip-chart paper source, the passive paper guide directing the continuous strip of strip-chart paper through a radius of curvature toward the paper output aperture, the radius of curvature defined by a passage formed between an upper guide incorporated in the openable cover and having a downwardly facing guide surface and a lower guide incorporated in the device body and having an upwardly facing guide surface, each of the guide surfaces adapted to provide low friction interaction with the continuous strip of strip-chart paper.

11. The device of claim 10 wherein the paper guide redirects the paper strip from the initial direction to a new direction, the new direction differing from the initial direction by an angle substantially equal to ninety degrees.

12. The device of claim 10 wherein the paper output aperture is positioned such that the paper strip exits the passive paper guide at an angle substantially equal to ninety degrees from the vertical.

13. The device of claim 10, wherein the downwardly facing guide surface comprises a curved planar surface substantially following the radius of curvature along one axis, the downwardly facing and upwardly facing guide surfaces including a plurality of ridges protruding therefrom.

* * * * *

UNITED STATES PATENT AND TRADEMARK OFFICE
CERTIFICATE OF CORRECTION

PATENT NO. : 5,667,121
DATED : September 16, 1997
INVENTOR(S) : D.J. Hill

It is certified that error appears in the above-identified patent and that said Letters Patent is hereby corrected as shown below:

COLUMN     LINE

6              6-7              "ther-ebetween" should be hyphenated --there-between--
(Claim 1,      lines 24-25)

Signed and Sealed this

Third Day of March, 1998

BRUCE LEHMAN

Attest:

Attesting Officer            Commissioner of Patents and Trademarks